United States Patent
Hirama et al.

(10) Patent No.: US 11,321,933 B2
(45) Date of Patent: May 3, 2022

(54) INFORMATION PROCESSING APPARATUS CONFIGURED TO DETERMINE A LOCATION OF A CANDIDATE FOR A MARKER FOR AUGMENTED REALITY

(71) Applicant: TOSHIBA TEC KABUSHIKI KAISHA, Tokyo (JP)

(72) Inventors: Mika Hirama, Tokyo (JP); Akihiko Fujiwara, Nara (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/911,347

(22) Filed: Jun. 24, 2020

(65) Prior Publication Data

US 2021/0090350 A1 Mar. 25, 2021

(30) Foreign Application Priority Data

Sep. 24, 2019 (JP) .............................. JP2019-173475

(51) Int. Cl.
*G06T 19/20* (2011.01)
*G06T 7/80* (2017.01)
(Continued)

(52) U.S. Cl.
CPC .............. *G06T 19/20* (2013.01); *G06T 7/337* (2017.01); *G06T 7/80* (2017.01); *G06T 19/006* (2013.01)

(58) Field of Classification Search
None
See application file for complete search history.

(56) References Cited

U.S. PATENT DOCUMENTS 9,918,204 B1 * 3/2018 Cote ....................... H04W 4/70
2010/0194782 A1 * 8/2010 Gyorfi ................. H04W 4/022
345/633

(Continued)

FOREIGN PATENT DOCUMENTS

JP 2017-162013 A 9/2017

OTHER PUBLICATIONS

Extended European Search Report dated Feb. 5, 2021 in corresponding European Patent Application No. 20190150.1, 12 pages.
(Continued)

*Primary Examiner* — Jeffrey J Chow
(74) *Attorney, Agent, or Firm* — Kim & Stewart LLP (57) ABSTRACT

An information processing apparatus includes a camera acquiring an image, a memory storing a feature value of an image associated with a location, and a processor. When a current location of the apparatus is not stored in the memory, the processor extracts a first area from an acquired image, acquires a first feature value of the first area, and when a feature value that is substantially identical with the first feature value is stored in the memory, determines the current location using a location stored in the memory in association with the feature value. When the current location is stored in the memory, the processor extracts a second area from an acquired image, acquires a second feature value of the second area, determines a location corresponding to the second area using the current location, and stores in the memory the determined location in association with the second feature value.

17 Claims, 6 Drawing Sheets

(51) Int. Cl.
*G06T 7/33* (2017.01)
*G06T 19/00* (2011.01)

(56) References Cited

U.S. PATENT DOCUMENTS

| 2011/0064312 | A1* | 3/2011 | Janky | G06K 9/00 |
| | | | | 382/195 |
| 2016/0171773 | A1 | 6/2016 | Hara | |
| 2018/0137686 | A1 | 5/2018 | Fukuchi et al. | |
| 2019/0371279 | A1* | 12/2019 | Mak | G09G 5/38 |
| 2020/0334901 | A1* | 10/2020 | Upendran | G06T 19/20 |

OTHER PUBLICATIONS

Zhang et al., "A context-aware framework supporting complex ubiquitous scenarios with Augmented Reality enabled" Pervasive Computing and Applications (ICPCA), 2010 5th International Conference On, IEEE, Dec. 1, 2010, pp. 69-74.

Bleser et al., "Real-time vision-based tracking and reconstruction", Journal of Real-Time Image Processing, vol. 2, No. 2-3, Oct. 30, 2007, pp. 161-175.

Leizea, "Development and Improvement of Optical Tracking Methods towards Registering the Deformations of 3D Non-Rigid Bodies in Real Time for Augmented Reality Applications", PhD Thesis, Feb. 1, 2015, pp. 1-314.

Szeliski, "Computer Vision: Algorithms and Applications" Aug. 18, 2009, pp. 1-979 Retrieved from the Internet: URL:http://szeliski.org/Book/drafts/SzeliskiBook 20100903 draft.pdf.

Lepetit et al: "Monocular Model-Based 3D Tracking of Rigid Objects: A Survey", Foundations and Trends® in Computer Graphics and Vision, Jan. 1, 2005, pp. 1-89 Retrieved from the Internet:URL:http://citeseerx.ist.psu.edu/viewdoc/download?doi=10.1.1.84.8498&rep=repl&type=pdf.

Groufsky: "An embedded augmented reality system", Feb. 10, 2011, 114 pages Retrieved from the Internet:URL:http://hdl.handle.net/10092/6259.

Billinghurst et al.: "A Survey of Augmented Reality", Foundations and Trends® in Human-Computer Interaction, vol. 8, No. 2-3, 2014, pp. 73-272.

Fua et al: "Vision Based 3D Tracking and Pose Estimation for Mixed Reality" In: "Emerging Technologies of Augmented Reality", Jan. 1, 2007, IGI Global, pp. 1-22.

* cited by examiner

| T1 | | | | |
|---|---|---|---|---|
| MARKER ID | FEATURE VALUE DATA | POSITION DATA | RELATIVE POSTURE DATA | HISTORY DATA |
| 0001 | F0001 | P0001 | R0001 | H0001 |
| 0002 | F0002 | P0002 | R0002 | H0002 |
| 0004 | F0004 | P0004 | R0004 | H0004 |
| ⋮ | ⋮ | ⋮ | ⋮ | ⋮ |

INFORMATION PROCESSING APPARATUS CONFIGURED TO DETERMINE A LOCATION OF A CANDIDATE FOR A MARKER FOR AUGMENTED REALITY

CROSS-REFERENCE TO RELATED APPLICATION

This application is based upon and claims the benefit of priority from Japanese Patent Application No. 2019-173475, filed Sep. 24, 2019, the entire contents of which are incorporated herein by reference.

FIELD

Embodiments described herein relate generally to an information processing apparatus, a method performed thereby, and an information processing system.

BACKGROUND

Augmented reality (AR) allows various information to be presented to a user by superimposing a virtual object on a real-world environment. By presenting various information, augmented reality can support shopping of a customer in a store, an operation of a worker at a work site, and the like.

It is known to use an AR marker (hereinafter, simply referred to as "marker") to calculate orientation and positioning of the AR device for purposes of tracking. The AR device can perform such calculation by detecting the marker and monitoring the position of the marker for tracking. To achieve the marker-based tracking, it is necessary for the AR device to know the location or position coordinates of the marker in the coordinate system of the real-world environment, which can be referred to as a global coordinate system. Therefore, it is necessary to input and register the coordinates of the marker in the global coordinate system in advance, which is troublesome. In addition, it is also necessary to position the marker on a wall or the like.

DETAILED DESCRIPTION

An information processing apparatus according to one embodiment includes a camera configured to acquire an image, a memory that stores a feature value of an image in association with a location corresponding to the image, and a processor. The processor is configured to, when a current location of the information processing apparatus is not stored in the memory, extract a first area from an acquired image, acquire a first feature value of the first area, and when a feature value that is substantially identical with the first feature value is stored in the memory, determine the current location of the information processing apparatus using a location that is stored in the memory in association with the feature value. The processor is further configured to, when the current location is stored in the memory, extract a second area from an acquired image, acquire a second feature value of the second area, determine a location corresponding to the second area using the current location of the information processing apparatus, and store in the memory the determined location in association with the second feature value.

Hereinafter, an information providing system according to an embodiment will be described using the drawings. In addition, in each of the drawings used for the description, the scale of each of components may be appropriately changed. In each of the drawings and the present disclosure, the same components are represented by the same reference numerals.

Figure 1:
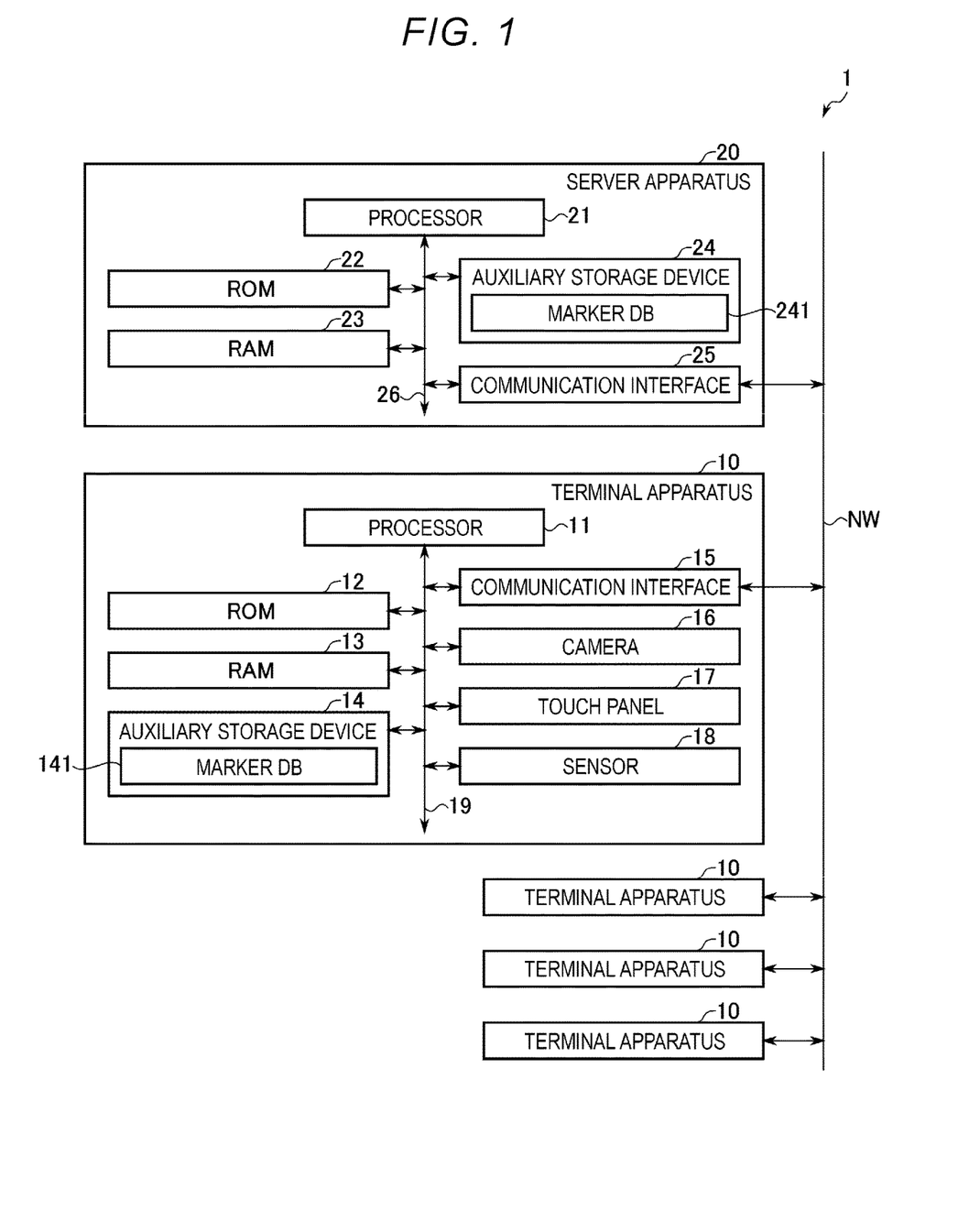
FIG. 1 is a block diagram of an information providing system according to an embodiment.

FIG. 1 is a block diagram of an information providing system 1 according to an embodiment. The information providing system 1 provides information using augmented reality in a specific space such as a shop or a work site. The specific space is not limited to an indoor environment. The information providing system 1 includes, for example, a plurality of terminal apparatuses 10 and a server apparatus 20.

The terminal apparatuses 10 and the server apparatus 20 are connected to a network NW. Typically, the network NW is a communication network including a local area network (LAN). Alternatively, the network NW may be a communication network including the Internet.

The terminal apparatus 10 superimposes a virtual object on a real-world image captured by a camera in real time. Accordingly, the terminal apparatus 10 operates as a display apparatus for augmented reality. The terminal apparatus 10 is, for example, a tablet terminal, a smartphone, or a head-mounted display (HMD). The terminal apparatus 10 used in a shop or the like is a tablet terminal attached to a wheeled moving object such as a shopping cart or other carts. For example, the terminal apparatus 10 includes a processor 11, a read only memory (ROM) 12, a random-access memory (RAM) 13, an auxiliary storage device 14, a communication interface 15, a camera 16, a touch panel 17, and a sensor 18. These units are connected to each other via a bus 19 or the like.

The processor 11 executes various processes and controls each of the units to perform various functions of the terminal apparatus 10 according to a program(s) such as firmware, system software, or application software stored in the ROM 12, the auxiliary storage device 14, or the like. In addition, the processor 11 executes processes described below according to the programs. The processor 11 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 11 may be any combination of the above-recited components.

The ROM 12 is a read-only nonvolatile memory. The ROM 12 stores, for example, the firmware among the above-described programs. In addition, the ROM 12 also stores data or the like that are used for the processor 11 to execute various processes.

The RAM 13 is a main memory of the terminal apparatus 10. The RAM 13 is a rewritable memory. The RAM 13 may be used as, for example, a work area that temporarily stores data used for the processor 11 to execute various processes. The RAM 13 is typically a volatile memory.

The auxiliary storage device 14 is, for example, an electric erasable programmable read-only memory (EEPROM), a hard disk drive (HDD), or a flash memory can be used. The auxiliary storage device 14 stores, for example, the system software and the application software among the above-described programs. In addition, the auxiliary storage device 14 stores, for example, data used for the processor 11 to execute various processes, data generated during a process executed by the processor 11, or various set values.

Figure 2:
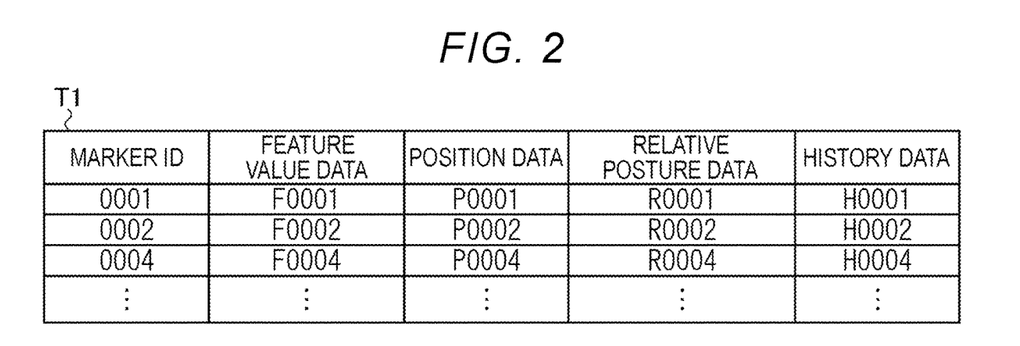
FIG. 2 is a diagram illustrating a structure of a marker database (DB).

In addition, the auxiliary storage device 14 stores a marker DB 141. The marker DB 141 stores and manages information for each marker. For example, the marker DB 141 stores a table T1 illustrated in FIG. 2. FIG. 2 is a diagram illustrating a structure of the table T1 of the marker DB.

Using the table T1, the marker DB 141 associates feature value data, position data, and history data with a marker ID for each marker.

The marker ID is unique identification information assigned to each marker.

The feature value data is data indicating a feature value of an image including a marker.

The position data is, for example, data indicating a position and a posture or an orientation (hereinafter simply referred to as "position posture") of a marker in the global coordinate system, which represent a relationship between the global coordinate system and the marker coordinate system.

Relative posture data is data indicating a relative posture to the terminal apparatus 10 during marker registration.

The history data is data indicating history of the position posture of a marker. When a position posture of a marker is obtained multiple times, the history data stores the position postures obtained these multiple times as a series.

The communication interface 15 is an interface used for the terminal apparatus 10 to execute communication via the network NW or the like.

The camera 16 acquires an image. In addition, the camera 16 outputs the acquired image data. A moving image is one type of the image.

The touch panel 17 includes, for example, a display such as a liquid crystal display or an organic electro-luminescence (EL) display and a pointing device accepting a touch input. The display included in the touch panel 17 displays a screen for notifying various information to an operator of the terminal apparatus 10. In addition, the touch panel 17 functions as an input device that receives a touch operation of the operator.

The terminal apparatus 10 is typically provided such that the camera 16 faces opposite to a display surface of the touch panel 17. That is, an optical axis direction of light incident on the camera 16 is identical with a normal direction of the touch panel 17.

The sensor 18 is used for estimating a position posture of the terminal apparatus 10. The sensor 18 outputs a measured value. The sensor 18 is, for example, an accelerometer, a gyroscope, an odometer, or an electromagnetic compass, a global navigation satellite system (GNSS) sensor such as a global positioning system (GPS) sensor, a depth sensor, or an electromagnetic, optical, mechanical, or ultrasonic tracker. As the sensor 18, the terminal apparatus 10 may include a plurality of sensors among the above-described sensors. In addition, the sensor 18 may be attached to a wheeled moving object such as a shopping cart.

In addition, the sensor 18 may be configured to communicate with external apparatuses through a wired or wireless connection.

The bus 19 is, for example, a control bus, an address bus, or a data bus, and conveys a signal that is transmitted and received between the units of the terminal apparatus 10.

The server apparatus 20 communicates with the terminal apparatuses 10 in order to share common data. The server apparatus 20 includes, for example, a processor 21, a ROM 22, a RAM 23, an auxiliary storage device 24, and a communication interface 25. These units are connected to each other via a bus 26 or the like.

The processor 21 executes various processes and controls each of the units to perform various functions of the server apparatus 20 according to a program(s) such as firmware, system software, or application software stored in the ROM 22, the auxiliary storage device 24, or the like. In addition, the processor 21 executes processes described below according to the programs. The processor 21 is, for example, a CPU, an MPU, a SoC, a DSP, a GPU, an ASIC, a PLD, or a FPGA. Alternatively, the processor 21 may be any combination of the above-recited components.

The ROM 22 is a read-only nonvolatile memory. The ROM stores, for example, the firmware among the above-described programs. In addition, the ROM 22 also stores data or the like that are used for the processor 21 to execute various processes.

The RAM 23 is a main memory of the server apparatus 20. The RAM 23 is a rewritable memory. The RAM 23 may be used as, for example, a work area that temporarily stores data used for the processor 21 to execute various processes. The RAM 23 is typically a volatile memory.

The auxiliary storage device 24 is, for example, an EEPROM, a HDD, or a flash memory. The auxiliary storage device 24 stores, for example, the system software and the application software among the above-described programs. In addition, the auxiliary storage device 24 stores, for example, data used for the processor 21 to execute various processes, data generated during a process performed by the processor 21, or various set values.

In addition, the auxiliary storage device 24 stores a marker DB 241. The marker DB 241 stores the same data as the marker DB 141.

Further, the auxiliary storage device 24 stores a terminal list that is a list of the terminal apparatuses 10 included in the information providing system 1.

The communication interface 25 is an interface used for the server apparatus 20 to execute communication via the network NW or the like.

The bus 26 is, for example, a control bus, an address bus, or a data bus, and conveys a signal that is transmitted and received between the units of the server apparatus 20.

Hereinafter, an operation of the information providing system 1 according to an embodiment will be described based on FIGS. 3 to 7. In the following description of the operation, the details of processes are merely exemplary, and various processes capable of obtaining the same effects can be appropriately used.

FIGS. 3 to 5 and 7 are flowcharts of processes performed by the terminal apparatus 10. Specifically, the processor 11 of the terminal apparatus 10 executes the processes in accordance with, for example, the programs stored in the ROM 12, the auxiliary storage device 14, and the like. For example, the processor 11 executes processes of FIGS. 3 to 5 and processes of FIG. 7 concurrently or in parallel.

Figure 6:
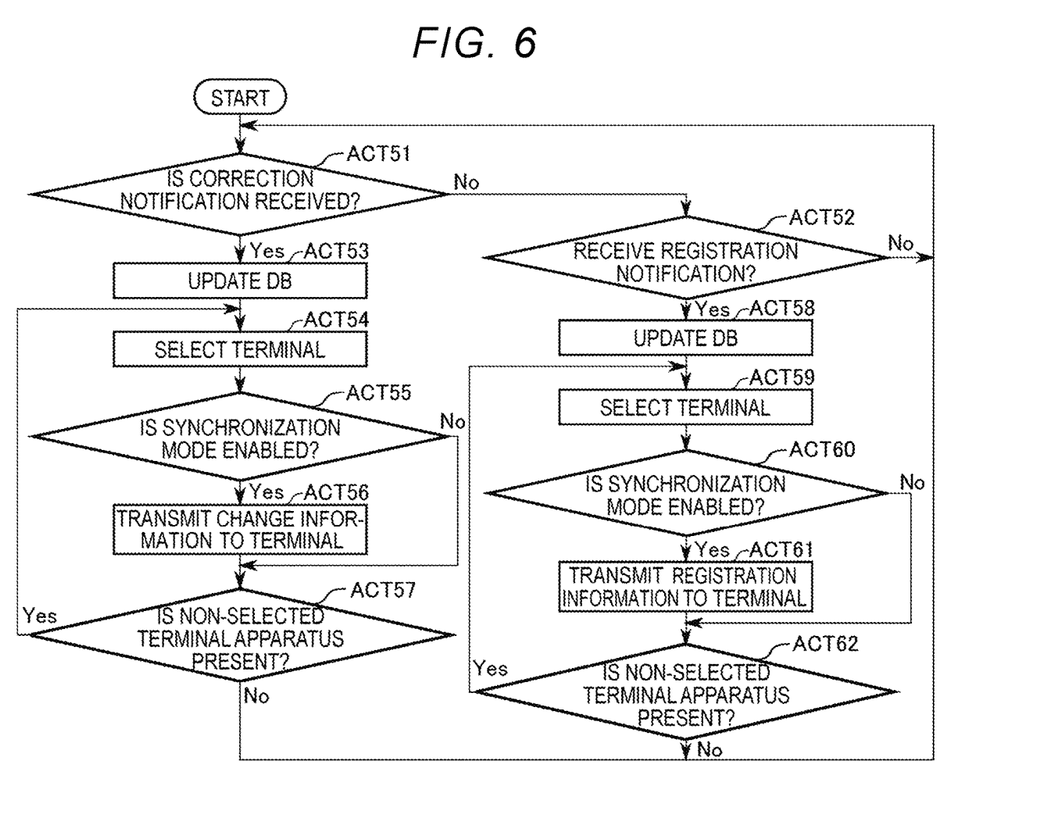
FIG. 6 is a flowchart of processes performed by a server apparatus.

FIG. 6 is a flowchart of processes performed by the server apparatus 20. Specifically, the processor 21 of the server apparatus 20 executes the processes in accordance with, for example, the programs stored in the ROM 22, the auxiliary storage device 24, and the like.

Figure 3:
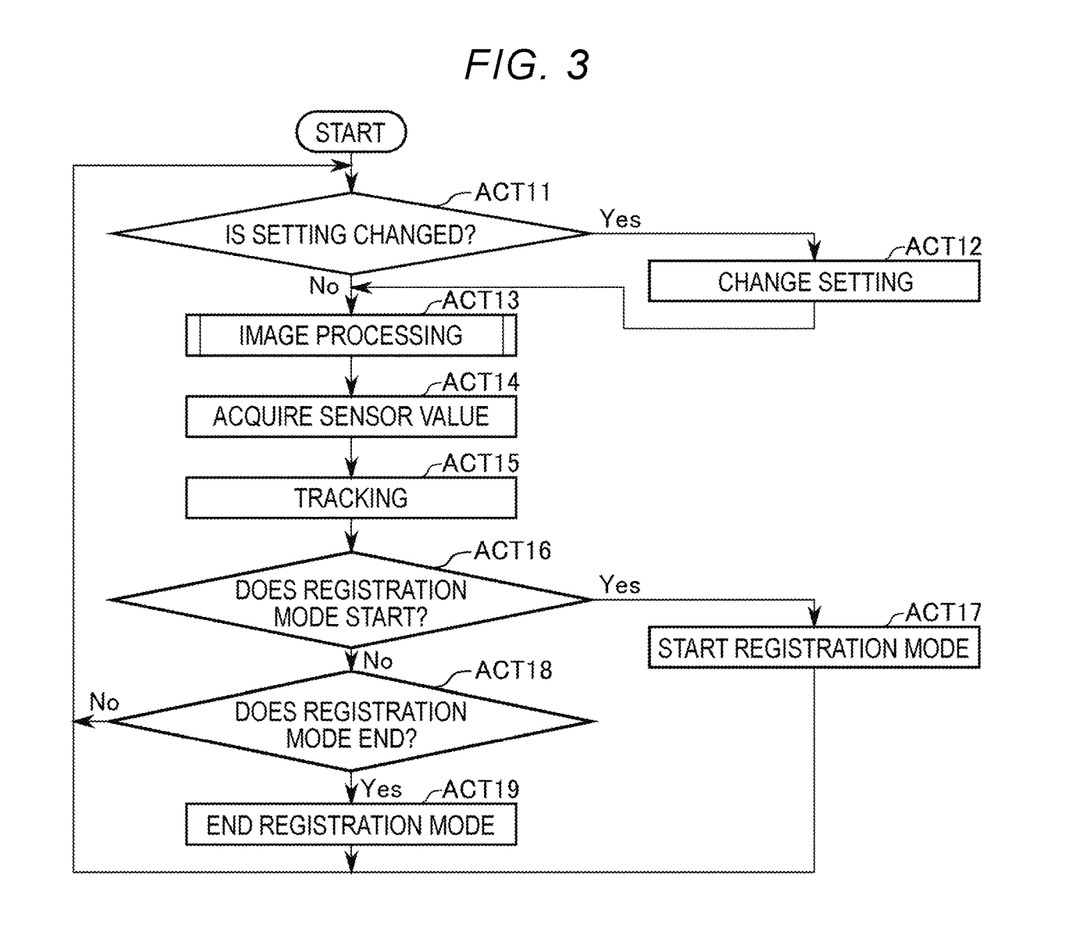
FIGS. 3-5 are flowcharts of processes performed by a terminal apparatus.

The processor 11 of the terminal apparatus 10 starts the process illustrated in FIG. 3, for example, along with the start-up of software for augmented reality.

In ACT 11 of FIG. 3, the processor 11 determines whether an operation of changing settings is executed. When the operation of changing the settings is executed, the processor 11 determines Yes in ACT 11 and proceeds to ACT 12.

In ACT 12, the processor 11 stores the settings that have been changed by a user operation. The settings include: whether a registration mode is enabled or disabled, whether a synchronization mode is enabled or disabled, start conditions of the registration mode, and end conditions of the registration mode.

In the registration mode, a marker is automatically registered. The registration mode can be enabled and disabled automatically or manually.

In the synchronization mode, the details of the registration of the marker are shared with another terminal apparatus 10.

The start conditions of the registration mode are used for automatically switching the registration mode from the disabled state to the enabled state. The start conditions include: a predetermined date, elapse of a predetermined period of time from the previous registration mode, and entrance of the terminal apparatus 10 into a predetermined area.

The end conditions of the registration mode are used for automatically switching the registration mode from the enabled state to the disabled state. The end conditions include: a predetermined date, elapse of a predetermined period of time from the enabling of the registration mode, exit of the terminal apparatus 10 from a predetermined area, and traveling once around a predetermined range in a state where the registration mode is enabled. For example, the predetermined range is a range where the information providing system 1 provides information using augmented reality, e.g., a work site in a shop.

On the other hand, when the operation of changing the setting is not executed, the processor 11 determines No in ACT 11 and proceeds to ACT 13.

Figure 4:
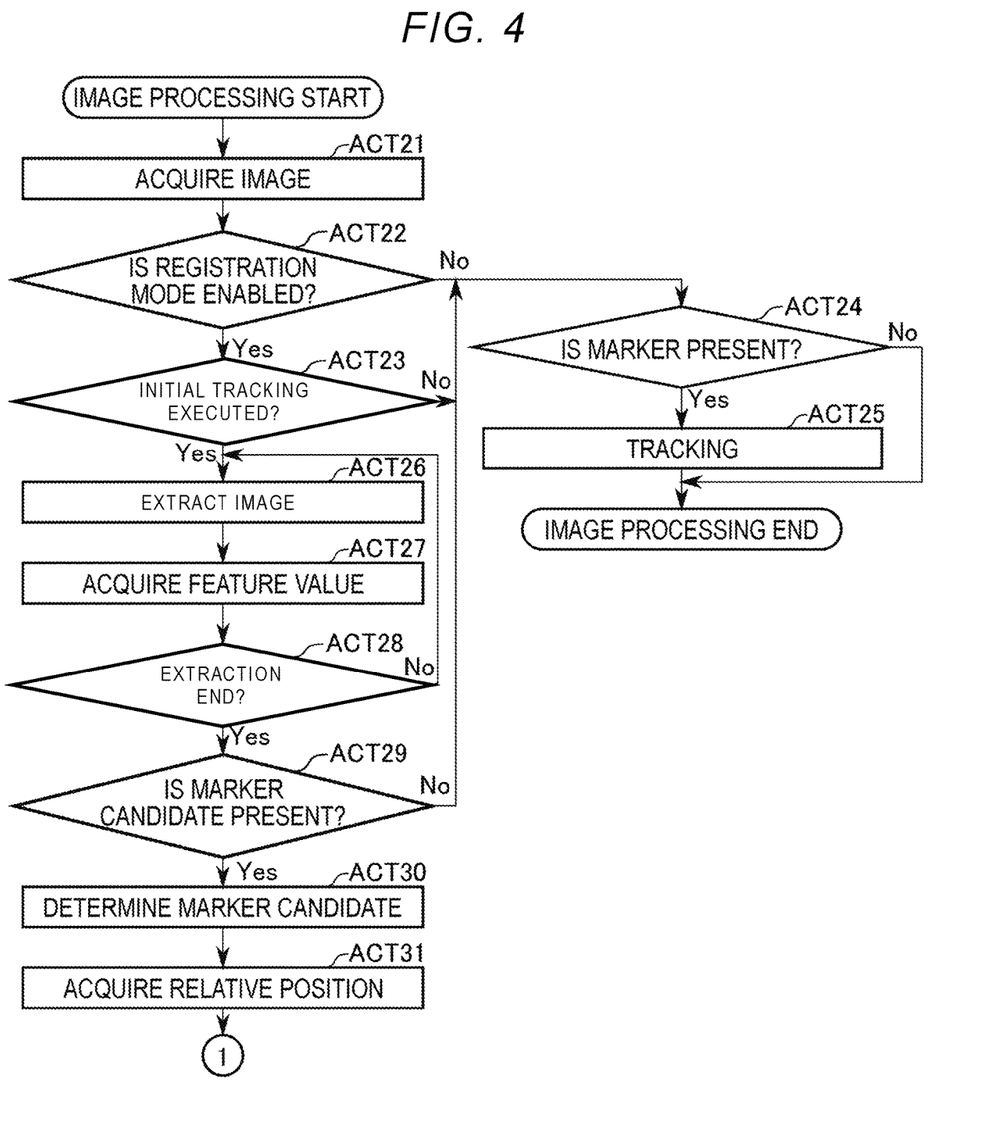
Figure 5:
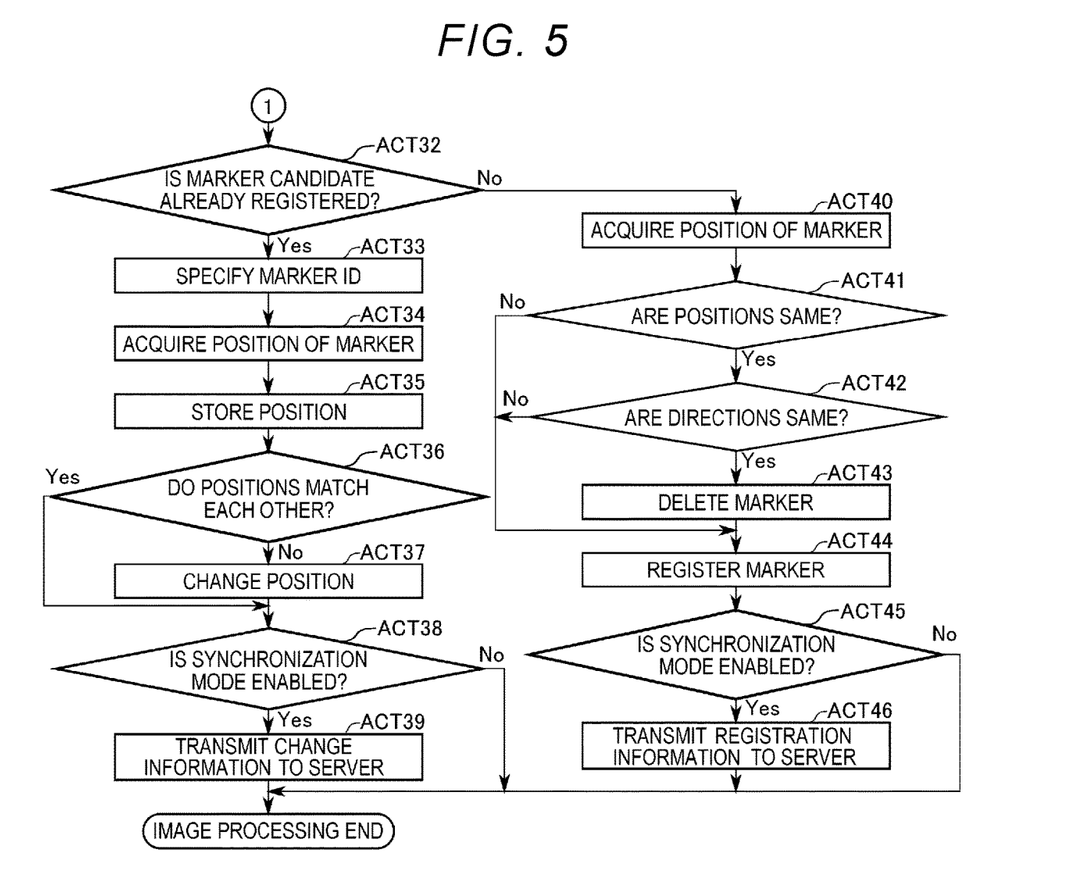

In ACT 13, the processor 11 executes image processing illustrated in FIGS. 4 and 5.

In ACT 21 of FIG. 4, the processor 11 acquires an image output from the camera 16. Hereinafter, the image acquired herein will be referred to as "acquired image".

Figure 8:
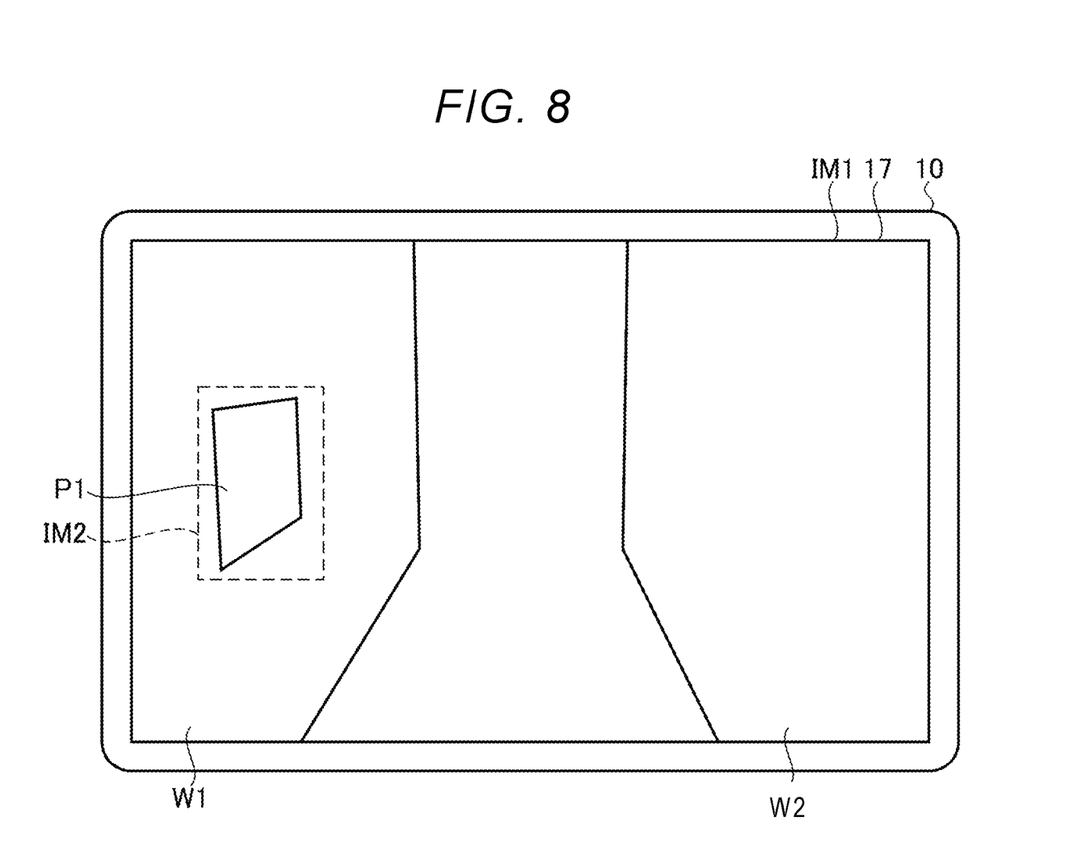
FIG. 8 is a diagram illustrating an image displayed by the terminal apparatus.

For example, the processor 11 acquires an image IM1 illustrated in FIG. 8. FIG. 8 shows the image IM1 displayed on the touch panel 17 of the terminal apparatus 10. The image IM1 illustrated in FIG. 8 is an image captured by the camera 16 while the terminal apparatus 10 is passing through a passage interposed between a left wall W1 and a right wall W2. On the left wall W1, a poster P1 is pasted. The poster P1 is, for example, a point of purchase (POP) advertisement.

In ACT 22, the processor 11 determines whether the registration mode is enabled. When the registration mode is enabled, the processor 11 determines Yes in ACT 22 and proceeds to ACT 23.

In ACT 23, the processor 11 determines whether initial tracking has been executed. The initial tracking is first tracking using a marker from the start of the process illustrated in FIGS. 3 to 5. Until the initial tracking is executed, the global coordinate system and the coordinate system of the terminal apparatus 10 are not accurately associated with each other. Therefore, the above-described determination needs to be made.

When the initial tracking has not been executed, the processor 11 determines No in ACT 23 and proceeds to ACT 24. When the registration mode is disabled, the processor 11 determines No in ACT 22 and proceeds to ACT 24.

In ACT 24, the processor 11 determines whether a marker is present in the acquired image by referring to the marker DB. The processor 11 determines whether a marker is present using a feature value stored in the marker DB. Specifically, similar to ACTs 26-28 described later, the processor 11 extracts rectangular images from the acquired image, acquires a feature value of each extracted image, and compares each acquired feature value with feature values that have been registered in the marker DB. When a substantially identical feature value has been registered, the processor 11 determines that a marker is present in the acquired image. When it is determined that a marker is not present in the acquired image, the processor 11 determines No in ACT 24 and ends the image processing illustrated in FIGS. 4 and 5. On the other hand, when it is determined that a marker is present in the acquired image by referring to the marker DB, the processor 11 determines Yes in ACT 24 and proceeds to ACT 25.

In ACT 25, the processor 11 executes tracking using the marker that has been determined to be present. By executing tracking, the processor 11 associates the coordinate system of the terminal apparatus 10 with the global coordinate system. As a result, the processor 11 recognizes the position posture of the terminal apparatus 10 in the global coordinate system. The position posture of the terminal apparatus 10 is the position posture of the camera 16 and the position posture of the touch panel 17. The processor 11 ends the image processing illustrated in FIGS. 4 and 5 after the process of ACT 25.

When the initial tracking has been executed, the processor 11 determines Yes in ACT 23 and proceeds to ACT 26.

In ACT 26, the processor 11 extracts a rectangular image from the acquired image according to a predetermined rule. The process of ACT 26 is executed multiple times until the processor 11 determines Yes in ACT 28. Whenever the process of ACT 26 is performed, rectangular images of different portions are extracted from the acquired image. For example, the processor 11 initially extracts a rectangular image from an upper left corner of the acquired image, extracts a rectangular image shifted from the previously-extracted rectangular image in horizontal or vertical directions, and repeats the extraction until a rectangular image is extracted from the lower right corner of the acquired image. The size of the rectangular shape may be fixed or variable. The aspect ratio of the rectangular shape may be fixed or variable. FIG. 8 shows an example of such a rectangular image IM2.

In ACT 27, the processor 11 acquires a feature value of the rectangular image. In order to acquire the feature value, the processor 11 uses, for example a well-known method. In addition, the processor 11 acquires a feature value score. The feature value score represents the degree to which the rectangular image is suitable as a marker. The feature value score refers to, for example, a range of 0 to 100, in which as the score increases, the rectangular image is more suitable as a marker. The feature value score decreases, for example, when the rectangular image is a repeat image in which the same pattern is repeated. In addition, the feature value score is likely to be high in an image including a POP advertisement. For example, in FIG. 8, the rectangular image IM2 is a rectangular image having the highest feature value score among the rectangular images extracted from the acquired image IM1. The rectangular image IM2 is indicated by a bounding box shape including the poster P1.

In ACT 28, the processor 11 determines whether the extraction from the acquired image has ended. For example, when all areas have been extracted from the acquired image, the processor 11 determines that the extraction has ended. When the extraction from the acquired image has not ended, the processor 11 determines No in ACT 28 and returns to ACT 26. On the other hand, when the extraction from the acquired image has ended, the processor 11 determines Yes in ACT 28 and proceeds to ACT 29.

In ACT 29, the processor 11 determines whether an image suitable as a marker is present among the rectangular images extracted in ACT 26. The processor 11 determines a rectangular image in which the feature value score obtained in ACT 27 is higher than or equal to a predetermined score as the image suitable as a marker. The predetermined score is, for example, 75. When the image suitable as a marker is not present among the cut rectangular images, the processor 11 determines No in ACT 29 and proceeds to ACT 24. When the image suitable as a marker is present among the cut rectangular images, the processor 11 determines Yes in ACT 29 and proceeds to ACT 30.

In ACT 30, the processor 11 determines a rectangular image having the highest feature value score among the rectangular images extracted in ACT 26 as a marker candidate. Hereinafter, the simple expression "marker candidate" represents the marker candidate determined in ACT 30.

In ACT 31, the processor 11 acquires a relative position and a relative posture of the marker candidate relative to the terminal apparatus 10. The relative position is, for example, a position at one point in the marker candidate. The point is, for example, the center of the poster P1. Alternatively, the relative position may be, for example, the average of a plurality of points. The relative posture is, for example, a posture of an object included in the marker candidate relative to the posture of the terminal apparatus 10. The object is, for example, the poster P1.

In ACT 32 of FIG. 5, the processor 11 determines whether the marker candidate is a registered marker by referring to the marker DB. For example, the processor 11 determines whether the marker candidate is the same as a registered marker by comparing the feature value obtained in ACT 27 of FIG. 4 to a feature value of each of markers registered in the marker DB. When the marker candidate is a registered marker, the processor 11 determines Yes in ACT 32 of FIG. 5 and proceeds to ACT 33.

In ACT 33, the processor 11 specifies a marker ID of the registered marker determined to be the same as the marker candidate in ACT 32 by referring to the marker DB. Hereinafter, the marker ID specified herein will be referred to as "specified ID".

In ACT 34, the processor 11 acquires a position posture of the marker candidate in the global coordinate system based on the relative position posture obtained in ACT 31 of FIG. 4 and the position posture of the terminal apparatus 10 in the global coordinate system.

In ACT 35 of FIG. 5, the processor 11 stores the position posture in the marker DB 141 by adding the position posture obtained in ACT 34 to measurement history associated with the specified ID in the marker DB 141.

In ACT 36, the processor 11 determines whether the position posture obtained in ACT 34 matches the position posture represented by the position data associated with the specified ID in the marker DB 141. The processor 11 may determine the position postures match each other as long as an error is within a predetermined range. When the position postures do not match each other, the processor 11 determines No in ACT 36 and proceeds to ACT 37.

In ACT 37, the processor 11 changes the position data of the marker specified by the specified ID based on the position posture obtained in ACT 34. For example, the processor 11 overwrites the position data with the position posture obtained in ACT 34. Alternatively, the processor acquires the position posture from a plurality of position postures obtained in the past using a statistical method based on the measurement history associated with the specified ID in the marker DB 141. For example, the processor 11 acquires the average of the plurality of position postures. The processor 11 overwrites the position data of the marker specified by the specified ID with the obtained position posture. The processor 11 may exclude an outlier when the average is obtained.

On the other hand, when the position posture obtained in ACT 34 matches the position posture represented by the position data associated with the specified ID in the marker DB 141, the processor 11 determines Yes in ACT 36 and proceeds to ACT 38. In addition, the processor 11 proceeds to ACT 38 after the process of ACT 37.

In ACT 38, the processor 11 determines whether the synchronization mode is enabled. When the synchronization mode is enabled, the processor 11 determines Yes in ACT 38 and proceeds to ACT 39.

In ACT 39, the processor 11 generates change information. The change information is information for instructing to change the position data of the marker. The change information includes the specified ID, and position data and measurement history data associated with the specified ID in the marker DB 141. The processor 11 generates the change information and instructs the communication interface 15 to transmit the change information to the server apparatus 20. Through the communication interface 15, the change information is transmitted to the server apparatus 20. The transmitted change information is received by the communication interface 25 of the server apparatus 20. The processor 11 ends the image processing illustrated in FIGS. 4 and 5 after the process of ACT 39.

On the other hand, in ACT 51 of FIG. 6, the processor 21 of the server apparatus 20 determines whether the change information has been received by the communication interface 25. When the change information has not been received, the processor 21 determines No in ACT 51 and proceeds to ACT 52.

In ACT 52, the processor 21 determines whether registration information has been received by the communication interface 25. When the registration information has not been received, the processor 21 determines No in ACT 52 and returns to ACT 51. Thus, the processor 21 repeats ACT 51 and ACT 52 until the change information or the registration information is received. The registration information will be described below.

When the change information has been received in the wait state of ACT 51 and ACT 52, the processor 21 determines Yes in ACT 51 and proceeds to ACT 53.

In ACT 53, the processor 21 updates the marker DB 241 based on the received change information. That is, in the marker DB 241, the processor 21 overwrites the position data and the measurement history data associated with the same ID as the specified ID included in the change information, with the position data and the measurement history data included in the change information.

In ACT 54, the processor 21 selects one of the terminal apparatuses 10 in the terminal list that have not yet been selected in ACT 54 to ACT 57. That is, the processor 21 selects one non-selected terminal apparatus 10.

In ACT 55, the processor 21 determines whether the synchronization mode of the terminal apparatus 10 that is being selected is enabled. The processor 21 checks whether the synchronization mode is enabled, for example, by inquiring the terminal apparatus 10. Alternatively, when the synchronization mode is switched, the terminal apparatus 10 may notify the server apparatus 20 of the changes. In such a case, the server apparatus 20 stores whether the synchronization mode of each of the terminal apparatuses 10 is enabled or disabled. When the synchronization mode of the terminal apparatus 10 that is being selected is enabled, the processor 21 determines Yes in ACT 55 and proceeds to ACT 56.

In ACT 56, the processor 21 instructs the communication interface 25 to transmit the change information to the terminal apparatus 10 that is being selected. The change information includes the same marker ID, the same position data, and the same measurement data as those of the information received in ACT 51. Through the communication interface 25, the change information is transmitted to the terminal apparatus 10. The transmitted change information is received by the communication interface 15 of the terminal apparatus 10.

Figure 7:
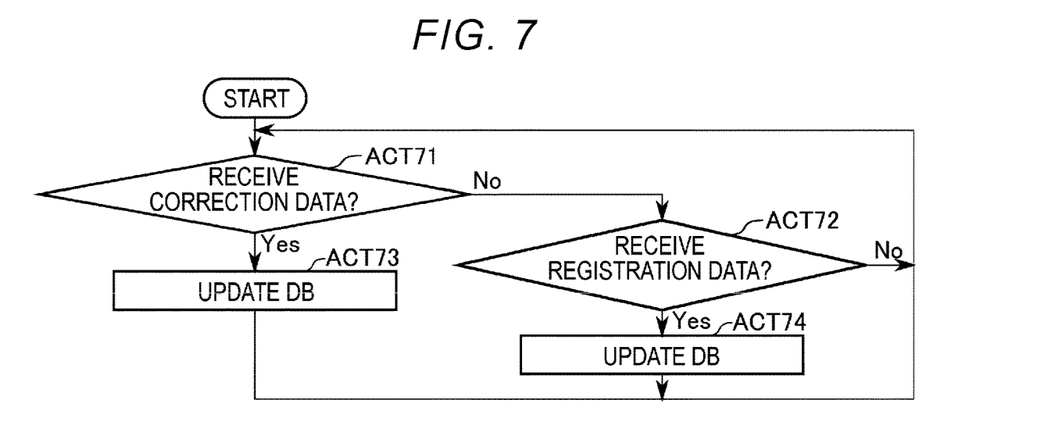
FIG. 7 is a flowchart of processes performed by the terminal apparatus.

On the other hand, in ACT 71 of FIG. 7, the processor of the terminal apparatus 10 determines whether the change information has been received by the communication interface 15. When the change information has not been received, the processor 11 determines No in ACT 71 and proceeds to ACT 72.

In ACT 72, the processor 11 determines whether registration information has been received by the communication interface 15. When the registration information has not been received, the processor 11 determines No in ACT 72 and returns to ACT 71. Thus, the processor 11 repeats ACT 71 and ACT 72 until the change information or the registration information is received.

When the change information has been received in the wait state of ACT 71 and ACT 72, the processor 11 determines Yes in ACT 71 and proceeds to ACT 73.

In ACT 73, the processor 11 updates the marker DB 141 based on the received change information. That is, in the marker DB 141, the processor 11 overwrites the position data and the measurement history data associated with the same ID as the marker ID included in the change information, with the position data and the measurement history data included in the change information. The processor 11 returns to ACT 71 after the process of ACT 73.

In ACT 57, the processor 21 determines whether a non-selected terminal apparatus 10 is present. When a non-selected terminal apparatus 10 is present, the processor 21 determines Yes in ACT 57 and returns to ACT 54. On the other hand, when a non-selected terminal apparatus 10 is not present, the processor 21 determines No in ACT 57 and returns to ACT 51.

As described above, by repeating ACT 54 to ACT 57 until a non-selected terminal apparatus 10 is not present, the processor 21 controls the communication interface 25 to transmit the change information to each of the terminal apparatuses 10 in which the synchronization mode is enabled.

On the other hand, the processor 11 of the terminal apparatus 10 ends the image processing illustrated in FIGS. 4 and 5 after the process of ACT 39 of FIG. 5. In addition, when the synchronization mode is disabled, the processor 11 determines No in ACT 38 of FIG. 5 and ends the image processing illustrated in FIGS. 4 and 5.

In addition, when the marker candidate is not a registered marker, the processor 11 determines No in ACT 32 of FIG. 5 and proceeds to ACT 40.

In ACT 40, the processor 11 acquires a position posture of the marker candidate as in ACT 34.

In ACT 41, the processor 11 determines whether a marker having the same position as that of the marker candidate is registered in the marker DB 141. For example, when the position of the marker candidate obtained in ACT 34 is within a predetermined distance from the position of any one of the markers registered in DB 141, the processor 11 determines that the marker having the same position is registered. When the marker having the same position is registered, the processor 11 determines Yes in ACT 41 and proceeds to ACT 42.

In ACT 42, the processor 11 determines whether the relative posture obtained in ACT 31 is the same as the relative posture represented by the relative posture data of the marker determined to have the same position in ACT 41. When the two relative postures are within a predetermined error, the processor 11 determines that the relative postures are the same. When the processor 11 determines that the relative postures are the same, the processor 11 determines Yes in Act 42 and proceeds to Act 43.

The reason why such determination is performed in ACT 42 is that markers having different feature values may be located at the same position. Even an image at the same position may be considered as different images depending on the positions of the terminal apparatuses 10 in the global coordinate system.

In ACT 43, the processor 11 deletes the marker having the same position and the same relative posture as those of the marker candidate from the marker DB 141. The processor 11 may delete the marker by deleting data regarding the marker or by setting a deletion flag or the like to prevent the marker from being used. Hereinafter, the marker ID of the marker deleted herein will be referred to as "deleted ID".

The processor 11 proceeds to ACT 44 after the process of ACT 43. In addition, when the marker having the same position is not registered, the processor 11 determines No in ACT 41 and proceeds to ACT 44. In addition, when the processor 11 determines that the relative postures are not the same, the processor 11 determines No in Act 42 and proceeds to Act 44.

In ACT 44, the processor 11 registers the marker candidate in the marker DB 141 as a new marker. To that end, the processor 11 adds a new record to the table T1. The processor 11 issues a marker ID that does not overlap with other registered marker IDs. A value of the marker ID of the new record is set as the issued marker ID. In addition, the processor 11 sets a value of feature value data of the new record as the feature value obtained in ACT 27 of FIG. 4. The processor 11 sets a value of position data of the new record as the position posture obtained in ACT 40. Further, the processor 11 sets a value of relative posture data of the new record as the relative posture obtained in ACT 31. In addition, the processor 11 adds the position posture obtained in ACT 40 to measurement history data of the new record.

In ACT 45, the processor 11 determines whether the synchronization mode is enabled. When the synchronization mode is disabled, the processor 11 determines No in ACT 45 and ends the image processing illustrated in FIGS. 4 and 5. On the other hand, when the synchronization mode is enabled, the processor 11 determines Yes in ACT 45 and proceeds to ACT 46.

In ACT 46, the processor 11 generates registration information. The registration information is information for instructing to newly register the marker. The registration information includes information regarding the marker newly registered in ACT 44, that is, a value of each field in the newly added record. Further, when the marker is deleted in ACT 43, the registration information includes deletion information. The deletion information is information for instructing to delete the marker. The deletion information includes the deleted ID. The processor 11 generates the registration information and instructs the communication interface 15 to transmit the registration information to the server apparatus 20. Through the communication interface 15, the registration information is transmitted to the server apparatus 20. The transmitted registration information is received by the communication interface 25 of the server apparatus 20. The processor 11 ends the image processing illustrated in FIGS. 4 and 5 after the process of ACT 46.

On the other hand, when the registration information is received in the wait state of ACT 51 and ACT 52 of FIG. 6, the processor 21 of the server apparatus 20 determines Yes in ACT 52 and proceeds to ACT 58.

In ACT 58, the processor 21 updates the marker DB 241 based on the received registration information. That is, the processor 21 adds the new record to the table T1 of the marker DB 241 such that the value of each field of the new record is set as the value included in the registration information. In addition, when the deletion information is included in the registration information, the processor 21 deletes the marker having the same marker ID as the marker ID included in the deletion information from the marker DB 241.

In ACT 59, the processor 21 selects one of the terminal apparatuses 10 in the terminal list that has not yet been selected in ACT 59 to ACT 62. That is, the processor 21 selects one non-selected terminal apparatus 10.

In ACT 60, the processor 21 determines whether the synchronization mode of the terminal apparatus 10 that is being selected is enabled. When the synchronization mode of the terminal apparatus 10 that is being selected is enabled, the processor 21 determines Yes in ACT 60 and proceeds to ACT 61.

In ACT 61, the processor 21 instructs the communication interface 25 to transmit the registration information to the terminal apparatus 10 that is being selected. Through the communication interface 25, the registration information is transmitted to the terminal apparatus 10. The transmitted registration information is received by the communication interface 15 of the terminal apparatus 10.

When the registration information is received in the wait state of ACT 71 and ACT 72 of FIG. 7, the processor 11 of the terminal apparatus 10 determines Yes in ACT 72 and proceeds to ACT 74.

In ACT 74, the processor 11 updates the marker DB 141 based on the received registration information. That is, the processor 11 adds the new record to the table T1 of the marker DB 141 such that the value of each field of the new record is set as the value included in the registration information. In addition, when the deletion information is included in the registration information, the processor 21 deletes the marker having the same marker ID as the marker ID included in the deletion information from the marker DB 241. The processor 11 returns to ACT 71 after the process of ACT 74.

On the other hand, the processor 11 of the terminal apparatus 10 proceeds to ACT 62 after the process of ACT 61. In addition, when the synchronization mode of the terminal apparatus 10 that is being selected is disabled, the processor 21 determines No in ACT 60 and proceeds to ACT 62.

In ACT 62, the processor 11 determines whether a non-selected terminal apparatus 10 is present. When a non-selected terminal apparatus 10 is present, the processor 11 determines Yes in ACT 62 and returns to ACT 58. On the other hand, when a non-selected terminal apparatus 10 is not present, the processor 11 determines No in ACT 62 and returns to ACT 51.

As described above, by repeating ACT 59 to ACT 62 until a non-selected terminal apparatus 10 is not present, the processor 21 controls the communication interface 25 to transmit the registration information to each of the terminal apparatuses 10 in which the synchronization mode is enabled.

On the other hand, the processor 11 ends the process of ACT 13 along with the end of the image processing illustrated in FIGS. 4 and 5.

In ACT 14, the processor 11 acquires a measured value output from the sensor 18.

In ACT 15, the processor 11 executes tracking based on the measured value acquired in ACT 14. As a result, the processor 11 can also recognize the position of the terminal apparatus 10 without executing tracking using the marker.

In ACT 16, the processor 11 determines whether one of the start conditions of the registration mode is satisfied. When one of the start conditions of the registration mode is satisfied, the processor 11 determines Yes in ACT 16 and proceeds to ACT 17.

In ACT 17, the processor 11 enables the registration mode. The processor 11 returns to ACT 11 after the process of ACT 17.

On the other hand, when one of the start conditions of the registration mode is not satisfied, the processor 11 determines No in ACT 16 and proceeds to ACT 18.

In ACT 18, the processor 11 determines whether one of the end conditions of the registration mode is satisfied. When one of the end conditions of the registration mode is not satisfied, the processor 11 determines No in ACT 18 and returns to ACT 11.

On the other hand, when one of the end conditions of the registration mode is satisfied, the processor 11 determines Yes in ACT 18 and proceeds to ACT 19.

In ACT 19, the processor 11 disables the registration mode. The processor 11 returns to ACT 11 after the process of ACT 19.

In the information providing system 1 according to the embodiments described above, the processor 11 of the terminal apparatus 10 extracts a rectangular image including a "marker-like" object from the image captured by the camera 16. The processor 11 then acquires a feature value of the rectangular image and calculates the position and posture of the object, and stores them in the marker DB 141. As a result, the rectangular image can be used as a marker. This way, the terminal apparatus 10 according to the embodiments automatically registers a marker without manual operations. In addition, in the terminal apparatus 10 according to the embodiments, an image including a poster or the like can be automatically registered as a marker. Therefore, it is not necessary to put AR markers on a wall or the like. In addition, in the terminal apparatus 10 according to the embodiments, even when a poster or the like is not put on a wall, as long as an object that results in a high feature value score is arranged, an image including such an object can be used as a marker.

In addition, in the information providing system 1 according to the embodiments described above, the processor of the terminal apparatus 10 determines whether the position of the rectangular image registered as a marker is the same as that of the marker that has been previously registered in the marker DB 141. When the processor 11 determines that the positions are the same, the processor 11 deletes the marker that has been registered in the marker DB 141 from the marker DB 141. As a result, a plurality of markers are prevented from being registered at the same position. In addition, in a case where the arrangement of an object has changed, for example, in a case where a poster has been replaced, when an image including the object has already been registered as a marker, this image cannot be used as a marker again. In the terminal apparatus 10 according to the embodiments, such a removed marker can be deleted. In the terminal apparatus 10 according to the embodiments, an image captured after the arrangement of an object has changed can be newly registered as a marker.

In the information providing system 1 according to the embodiments described above, when the position of a marker is different from the position that has been registered in the marker DB 141, the processor 11 of the terminal apparatus 10 updates the position of the marker. As a result, when the position of an object such as a poster has been moved to a different position, the terminal apparatus 10 can store the new position in the marker DB 141. In addition, the processor 11 can improve the accuracy of the position of the marker by updating the position of the marker stored in the marker DB 141 using the history in which the position of the marker was acquired.

In addition, in the information providing system 1 according to the embodiments described above, when the registration mode is enabled, the processor 11 of the terminal apparatus 10 automatically registers a marker. As a result, when the registration of a marker is unnecessary, the processing workload of the processor 11 can be reduced.

In addition, in the information providing system 1 according to the embodiments described above, the terminal apparatus 10 transmits data regarding a marker that has been newly registered. The data is transmitted to each of the terminal apparatuses 10 via the server apparatus 20. Each of the terminal apparatuses 10 receives the data and newly registers a marker based on the data. This way, in the information providing system 1 according to the embodiments, when one terminal apparatus 10 detects an image suitable as a marker, this image can be registered in a plurality of terminal apparatuses 10 as a marker. Accordingly, in the information providing system 1 according to the embodiments, it is not necessary to register a marker for each terminal apparatus 10.

The above-described embodiments can also be modified as follows.

In the above-described embodiments, the shape of the image cut by the processor 11 of the terminal apparatus 10 in ACT 26 is rectangular. However, the processor 11 may cut the image in another shape such as a circular shape.

Some or all of the processes that are executed by the processor 11 or the processor 21 in accordance with the programs in the above-described embodiments may be implemented by a circuit(s).

Each of the apparatuses according to the above-described embodiments is delivered to an operator of the apparatus, for example, in a state where a program(s) for executing each of the above-described processes is stored. Alternatively, the apparatus is delivered to the operator in a state where the program(s) is not stored. The program is separately distributed to the operator and is installed on the apparatus by the operator, e.g., a service person. In such a case, the program(s) can be stored in, for example, a removable storage medium such as a disk medium or a semiconductor memory or downloaded via the Internet, a LAN, or the like.

While certain embodiments have been described, these embodiments have been presented by way of example only, and are not intended to limit the scope of the inventions. Indeed, the novel embodiments described herein may be embodied in a variety of other forms; furthermore various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   a camera configured to acquire an image;
   a memory that stores a reference feature value of an image including a marker for augmented reality (AR); and
   a processor configured to:
      extract a first area from an acquired image,
      calculate a first feature value of the first area,
      compare the first feature value with the reference feature value to determine whether a candidate for a marker for AR is included in the first area,
      upon determining that the candidate is included in the first area, determine a location corresponding to the first area based on a current location of the information processing apparatus and register in the memory the candidate using the determined location and the first feature value,
      determine whether a first location that is identical or substantially identical with the determined location has been registered in association with another feature value, and
      upon determining that the first location has been registered, update said another feature value with the first feature value.

2. The information processing apparatus according to claim 1, wherein the processor is further configured to determine an orientation of an object included in the first area, and store the orientation in the memory in association with the first feature value.

3. The information processing apparatus according to claim 1, wherein
   the processor is further configured to switch between a registration mode and a non-registration mode, and
   the determined location corresponding to the first area and the first feature data are stored in the memory only in the registration mode.

4. The information processing apparatus according to claim 3, wherein the processor switches from the non-registration mode to the registration mode based on any one of: a current date, an elapsed time from when the processor previously switched from the registration mode to the non-registration mode, and the current location of the information processing apparatus.

5. The information processing apparatus according to claim 1, wherein the processor is configured to extract the first area including a predetermined object.

6. The information processing apparatus according to claim 1, further comprising:
a network interface, wherein
the processor is further configured to control the network interface to transmit, to a server, the determined location in association with the first feature value.

7. The information processing apparatus according to claim 6, wherein the processor is further configured to acquire, from the server, a feature data of an image and a location corresponding to the image via the network interface.

8. The information processing apparatus according to claim 1, wherein the processor is further configured to, upon determining that the first location has been registered, update the first location and said another feature value with the determined location and the first feature value, respectively.

9. A method performed by an information processing apparatus for augmented reality visualizations, the method comprising:
storing in a memory a reference feature value of an image including a marker for augmented reality (AR);
acquiring an image using a camera;
extracting a first area from the acquired image;
calculating a first feature value of the first area;
comparing the first feature value with the reference feature value to determine whether a candidate for a marker for AR is included in the first area;
upon determining that the candidate is included in the first area, determining a location corresponding to the first area based on a current location of the information processing apparatus and registering in the memory the candidate using the determined location and the first feature value;
determining whether a first location that is identical or substantially identical with the determined location has been registered in association with another feature value; and
upon determining that the first location has been registered, updating said another feature value with the first feature value.

10. The method according to claim 9, further comprising:
determining an orientation of an object included in the first area, and
storing the orientation in the memory in association with the first feature value.

11. The method according to claim 9, further comprising:
switching between a registration mode and a non-registration mode, wherein
the determined location corresponding to the first area and the first feature data are stored in the memory only in the registration mode.

12. The method according to claim 11, wherein the non-registration mode is switched to the registration mode based on any one of: a current date, an elapsed time from when the processor previously switched from the registration mode to the non-registration mode, and the current location of the information processing apparatus.

13. The method according to claim 9, wherein the extracting of the second area further comprises extracting the first area including a predetermined object from the acquired image.

14. The method according to claim 9, further comprising: transmitting, to a server, the determined location in association with the first feature value.

15. The method according to claim 9, further comprising: said updating further includes updating the first location with the determined location.

16. An information processing apparatus, comprising:
a camera configured to acquire an image;
a memory that stores a reference feature value of an image including a marker for augmented reality (AR); and
a processor configured to:
extract a first area from an acquired image,
calculate a first feature value of the first area,
compare the first feature value with the reference feature value to determine whether a candidate for a marker for AR is included in the first area,
upon determining that the candidate is included in the first area, determine a location corresponding to the first area based on a current location of the information processing apparatus and register in the memory the candidate using the determined location and the first feature value,
determine whether the first feature value has been registered for a first marker for AR,
upon determining that the first feature value has been registered, specify an identifier of the first marker and determine whether a first location associated with the identifier is identical or substantially identical with the determined location, and
upon determining that the first location is not identical or substantially identical with the determined location, update the first location associated with the identifier with the determined location.

17. A method performed by an information processing apparatus for augmented reality visualizations, the method comprising:
storing in a memory a reference feature value of an image including a marker for augmented reality (AR),
acquiring an image using a camera,
extracting a first area from the acquired image,
calculating a first feature value of the first area,
comparing the first feature value with the reference feature value to determine whether a candidate for a marker for AR is included in the first area;
upon determining that the candidate is included in the first area, determining a location corresponding to the first area based on a current location of the information processing apparatus and registering in the memory the candidate using the determined location and the first feature value,
determining whether the first feature value has been registered for a first marker for AR,
upon determining that the first feature value has been registered, specifying an identifier of the first marker and determining whether a first location associated with the identifier is identical or substantially identical with the determined location, and
upon determining that the first location is not identical or substantially identical with the determined location, updating the first location associated with the identifier with the determined location.

* * * * *